United States Patent
Carver et al.

(10) Patent No.: US 9,536,129 B2
(45) Date of Patent: *Jan. 3, 2017

(54) FINGERPRINT SENSORS

(71) Applicant: CROSS MATCH TECHNOLOGIES, INC., Palm Beach Gardens, FL (US)

(72) Inventors: John F. Carver, Palm City, FL (US); Daniel H. Raguin, Acton, MA (US)

(73) Assignee: CROSS MATCH TECHNOLOGIES, INC., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,500

(22) Filed: Jan. 21, 2016

(65) Prior Publication Data

US 2016/0140380 A1 May 19, 2016

Related U.S. Application Data

(63) Continuation of application No. 14/548,006, filed on Nov. 19, 2014, now Pat. No. 9,245,167, which is a (Continued)

(51) Int. Cl.
*G06K 9/28* (2006.01)
*G06K 9/00* (2006.01)

(52) U.S. Cl.
CPC ......... *G06K 9/00046* (2013.01); *G06K 9/0004* (2013.01); *G06K 9/0012* (2013.01); *G06K 9/00013* (2013.01)

(58) Field of Classification Search
None
See application file for complete search history.

(56) References Cited

U.S. PATENT DOCUMENTS

| 4,394,773 A | 7/1983 | Ruell |
| 5,446,290 A * | 8/1995 | Fujieda ............... G06K 9/0004 250/227.11 |

(Continued)

FOREIGN PATENT DOCUMENTS

WO  WO 2010/051041  5/2010

OTHER PUBLICATIONS

DpiX Technology, dpiX, LLC, printout from www.dpix.com/tech.html, 2010.

(Continued)

*Primary Examiner* — Brian P Werner
(74) *Attorney, Agent, or Firm* — Kenneth J. Lukacher Law Group

(57) ABSTRACT

A sensor for detecting fingerprints is provided having first and second substrates, a two-dimensional array of sensing elements formed on the first substrate, and a plurality of thin-film transistors or TFTs for controlling the sensing elements at pixel locations along the array. Each of the sensing elements detects one of electrical signals (e.g., capacitance, resistance, or impedance), temperature, or light via one of the first or second substrates representative of one or more fingerprints. The top of the second substrate or the bottom of the first substrate may provide a platen upon which one or more fingers can be disposed. The sensor may be utilized in a fingerprint scanner having one or more processors driving sensing elements or reading from sensing elements analog signals representative of one or more fingerprints, and generating an image representative of the one or more fingerprints from the analog signals.

24 Claims, 6 Drawing Sheets

Related U.S. Application Data continuation of application No. 13/474,484, filed on May 17, 2012, now abandoned.

(60) Provisional application No. 61/486,766, filed on May 17, 2011.

(56) References Cited

U.S. PATENT DOCUMENTS

| | | | |
|---|---|---|---|
| 5,737,071 | A | 4/1998 | Arndt |
| 5,828,773 | A | 10/1998 | Setlak et al. |
| 5,953,441 | A | 9/1999 | Setlak |
| 5,991,467 | A | 11/1999 | Kamiko |
| 6,175,641 | B1 * | 1/2001 | Kallo ............... A61B 5/1172 382/116 |
| 6,292,576 | B1 | 9/2001 | Brownlee |
| 6,327,376 | B1 | 12/2001 | Harkin |
| 6,423,973 | B2 | 7/2002 | Choo et al. |
| 6,587,233 | B1 | 7/2003 | Salgado |
| 6,774,396 | B1 | 8/2004 | Chang et al. |
| 6,791,091 | B2 | 9/2004 | Rodricks et al. |
| 7,369,690 | B2 | 5/2008 | Joo et al. |
| 2001/0030324 | A1 | 10/2001 | Morikawa et al. |
| 2002/0018584 | A1 | 2/2002 | Johnson |
| 2003/0183019 | A1 * | 10/2003 | Chae ............... G06K 9/0004 73/862.624 |
| 2004/0252867 | A1 * | 12/2004 | Lan ................. G06K 9/0004 382/124 |
| 2005/0089203 | A1 | 4/2005 | Setlak |
| 2005/0229380 | A1 | 10/2005 | Deconde et al. |
| 2005/0281441 | A1 | 12/2005 | Martinsen et al. |
| 2006/0120573 | A1 | 6/2006 | Lori |
| 2006/0140456 | A1 | 6/2006 | Foundeur et al. |
| 2006/0159314 | A1 | 7/2006 | Foundeur et al. |
| 2006/0159317 | A1 | 7/2006 | Shyu et al. |
| 2006/0217915 | A1 | 9/2006 | Dinh |
| 2007/0041005 | A1 * | 2/2007 | Song ............... G06K 9/0004 356/71 |
| 2008/0157921 | A1 | 7/2008 | Hendriks et al. |
| 2008/0253626 | A1 | 10/2008 | Shuckers et al. |
| 2009/0066345 | A1 | 3/2009 | Klauk et al. |
| 2010/0113952 | A1 * | 5/2010 | Raguin ............. G06K 9/0012 600/509 |
| 2011/0169779 | A1 * | 7/2011 | Boer ................. G06F 3/0412 345/175 |
| 2011/0228211 | A1 | 9/2011 | Waters |

OTHER PUBLICATIONS

R.L. Weisfield, M.A. Hartney, R.A. Street, and R.B. Apte, "New Amorphous-Silicon Image Sensor for X-ray Diagnostic Medical Imaging Applications", Proc. SPIE Conf. On Physics of Medical Imaging, vol. 3336, pp. 444-452, 1998.

R. L. Weisfield, Amorphous silicon TFT X-ray image sensors, IEEE Int. Electron Dev. Meeting (IEDM 1998) Technical Dig., pp. 21-24, 1998.

* cited by examiner

FINGERPRINT SENSORS

This Application is a continuation of U.S. patent application Ser. No. 14/548,006, filed Nov. 19, 2014, now U.S. Pat. No. 9,245,167, which is a continuation of U.S. patent application Ser. No. 13/474,484, filed May 17, 2012, now abandoned, which claims the benefit of priority to U.S. Provisional Patent Application No. 61/486,766, filed May 17, 2011, which is herein incorporated by reference.

FIELD OF THE INVENTION

The present invention relates to sensors, methods, and systems for detecting one or more fingerprints, and particularly a sensor for detecting one or more fingerprints utilizing thin-film transistors (TFT). The present invention is particularly useful in providing a fingerprint sensor having sensing element(s) at each pixel location of a two-dimension array where sensing element(s) are coupled to a TFT at the pixel location for use in a fingerprint scanner to provide a two-dimension fingerprint image of one or more fingers. At each pixel location, a single sensing element of desired type or characteristic (e.g., light, electrical, or thermal sensing) may be coupled to a TFT enabling driving and readout of the sensing element, or multiple sensing elements of the same or different type may be coupled to a TFT.

BACKGROUND ON THE INVENTION

A thin-film transistor (TFT) is a particular kind of field-effect transistor. The most common applications of TFTs are displays, such as LCD TVs and monitors. Less common is the use of TFTs as sensors, with the one exception being the use of TFT sensor arrays (with a scintillation layer) for the purposes of digital radiography (see for example DPIX, Inc., Palo Alto, Calif.). Whether for use in a display or a sensor application, each of these applications employ an array of pixels in a two-dimensional (2D) grid where within each pixel, layers of thin films (metals, oxides and amorphous silicon, for example) are deposited onto a substrate that is typically glass of 1.0 mm or thinner thickness. TFTs are created at each pixel (typically two or three per pixel) to facilitate the addressing of individual pixels whether for driving or readout purposes.

Present commercial optical fingerprint scanners capture images of reflected light representing an image of a fingerprint onto complementary metal-oxide semiconductor (CMOS) or charge-coupled device (CCD) two dimensional sensors. Such CMOS and CCD sensors are similar and sometimes identical to those used in commercial digital cameras. Free-space optics such as refractive lenses that comprise a multi-element objective lens are used to image the reflected light off of the finger and onto the 2D sensors. Because of the presence of free-space optics, a relatively large distance must be between the finger and the sensor, resulting in a fingerprint scanner that is larger and bulkier than would be desired for certain applications (in particular mobile, hand-held applications). It would be desirable to avoid free-space optics so as to provide significantly more compact and potentially lighter weight scanners than are presently utilized.

SUMMARY OF THE INVENTION

Accordingly, it is a feature of the present invention is to provide a fingerprint sensor having arrays of sensing elements controlled by TFTs for detecting one of more fingerprints, and thereby provide a TFT fingerprint sensor, which avoids free-space optics of conventional fingerprint scanners.

Briefly described, the present invention embodies a sensor having first (base) and second (cover) substrates, a two-dimensional array of sensing elements formed at pixel locations on the first substrate, and thin-film transistors for controlling the sensing elements at each of the pixel locations. Each of the sensing elements detects one of electrical signals (e.g., capacitance, resistance, or impedance), temperature, or light via one of the first or second substrates representative of one or more fingerprints.

At each pixel location in the array, the sensing elements may be of the same type, such as light sensing, in which illumination is provided from below or within the sensor, or of two or more different types coupled to a common TFT at the pixel location, so that different characteristics (electrical, light, or temperature) from fingers may be detected. The first or second substrate may provide a platen surface for placement of one or more fingers, or where light sensing elements are present in the array, the platen surface of the sensor may be provided by the surface of an optical prism element disposed upon the sensor. Optionally, the optical prism element may provide the second substrate.

Optionally, the sensing elements represent different groups of multiple light sensing elements of different light sensing types or characteristics distributed uniformly or non-uniformly at pixel locations along the array. For example, the sensing elements may have a first group of light sensing elements and a second group of electrical or temperature sensing elements, where the first group is used for imaging fingerprint(s) and the second group may also be used for imaging fingerprint(s) or parts thereof, or for detecting liveliness of finger(s).

The present invention further comprises a system or scanner having the above sensor for detecting one or more fingerprints, and one or more processors, where each of the thin-film transistors controls the one or more of the sensing elements responsive to the processor(s) to enable the processor(s) to one or more of driving the one or more of the sensing elements or reading from the one or more sensing elements analog signals representative of one or more fingerprints, and generates an image representative of the one or more fingerprints responsive to the analog signals. One or more (or all) of the processor(s) may be part of a computer system. When the sensing elements of the array are at least optical sensing elements, illumination may be provided to the first and second substrates or from between the two substrates, such that the optical sensing elements detect a reflected part of illumination representative of one or more fingerprints.

Preferably, the arrays of TFT and coupled sensor(s) thereto are in 2D orthogonal grids. As the sensor of the present invention avoids the need for free-space optics described earlier, the magnification of the fingerprint(s) detected when light sensing elements are present is typically 1:1, but may be a slightly higher magnification in one axis due to the presence of a tilted platen as in the case of a prism element. For systems that have 1:1 magnification, the maximum pixel size desired for AFIS (Automatic Fingerprint Identification Systems) corresponds to 50.8×50.8 µm which translates to 500 points-per-inch (ppi). For a system that incorporates a 45 deg prism, the maximum pixel size is 50.8*sin(45)=35.9 µm.

In each pixel element of the array is a TFT to allow for individual driving and/or enabling reading of an analog value by the processor(s). Such may be enabled by drive/ read electronics to the TFTs. Each pixel element may contain one or more of the following sensing elements: a light sensor, light source, capacitance sensor, resistance sensor, impedance sensor, and thermal sensor. For the optical measurement of a fingerprint pressed in contact with a platen surface, at a minimum a light sensor per pixel is needed where the sensing element detects light. For optically sensitive TFT pixels, illumination by the fingerprint scanner may come from a light source external to the TFT sensor array such as from a light panel or light guide underneath the sensor (since it is printed on top of the first substrate and a portion of each pixel may be transmissive to allow light to transmit from underneath the array and illuminate a fingerprint that is above the first substrate of the sensor). Alternatively, the light source may be provided at each pixel of the array. By way of example, a light sensing element may be a PIN photodiode, a LED (light-emitting diode) or an OLED (organic light-emitting diode). Additionally, or in place of, other modes of detection by the sensing element may be used for measuring the electrical characteristics of the skin (resistance, capacitance, impedance) or temperature may be incorporated into each pixel. The electrical characteristics of the fingerprint may be the primary method for extracting the minutia detail required for enrollment, identification, and/or verification, or may be a complementary method used in order to determine that a fingerprint presented to the scanner system is an actual live finger and not a spoof or a dead finger. By incorporating electrical and/or temperature measurement systems, the scanner becomes more difficult to fool or spoof. By way of example, the array of the sensor may have at each pixel an optical sensing element and an electrical sensing element and in this manner be able to image a subject's fingerprint both optically and electrically. Alternatively, a TFT-based array may have predominantly one type of sensing elements for the purposes of imaging the fingerprint and a very low percentage of sensors of another technology that samples the fingerprint sparsely for the purposes of spoof detection or detection of the presence of the fingerprint. By way of example, consider an array that has 50.8 µm pixels wherein every area of 20×20 pixels (roughly 1×1 mm$^2$) contains a pixel with an electrical sensor. One mode of operation for such an array is to only read out the sparse electrical sensor array by the processor(s) and when the analog signals received falls within the expected values for a finger (for example impedance values at certain AC frequencies), the optical sensor array is turned on to read the actual fingerprint by the processor(s).

RFID functions may be incorporated into the scanner and the sensor of the present invention in order to interact with badge or other form of identification in addition to that provided by the presented fingerprint.

TFTs, since they use amorphous silicon rather than crystalline silicon, can be printed on flexible substrates. Flexible substrates can be advantageous since they can allow more compact fingerprint scanners which folds or rolls up when not in use. Alternately or in addition to, these flexible substrates can be fabricated in a "sling-like" configuration suitable for capture of rolled print equivalents. Flexible TFT-based arrays can be made very thin in order to accommodate "smart ID card" applications.

A surface of the second substrate facing the first substrate may be the top of the substrate in the sandwich light assembly of the first and second substrates and the array disposed there between. Alternatively, the surface of the first substrate opposite the array formed thereupon may be the top of the substrate, in this case the sensor may be considered "up-side-down", in which case a metal (like steel or aluminum) plate or substrate may be provided as part of the assembly. Thus, the array may be printed where the second substrate is considered the bottom of the sensor. The TFT is printed on top of the first substrate and the light to be collected comes from above the sensor. However, if the TFT needs to be encapsulated with a gel or epoxy, trapped air bubbles will hinder light coming from the object and reach the TFT sensor. By printing the sensor "upside-down" one avoids this potential issue. In other words, the sensor is made such that light is expected to be collected from the bottom of the first substrate. This way, if any encapsulating is required, trapped air bubbles will only affect the illumination light (and not even this if LEDs or OLEDs are present at each pixel in the array). This and can thus increase optical resolution of a scanner utilizing the sensor. The metal plate may encapsulate the "upside down" sensor, and strengthen the sensor as well as to act as a heat sink for temperature stabilization.

In addition to a fingerprint scanner, the sensor of the present invention may also be used to image other object(s), such as a document in the case of a document scanner, a signature to provide a signature/text reader, or a barcode to provide a barcode reader.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

Figure 1:
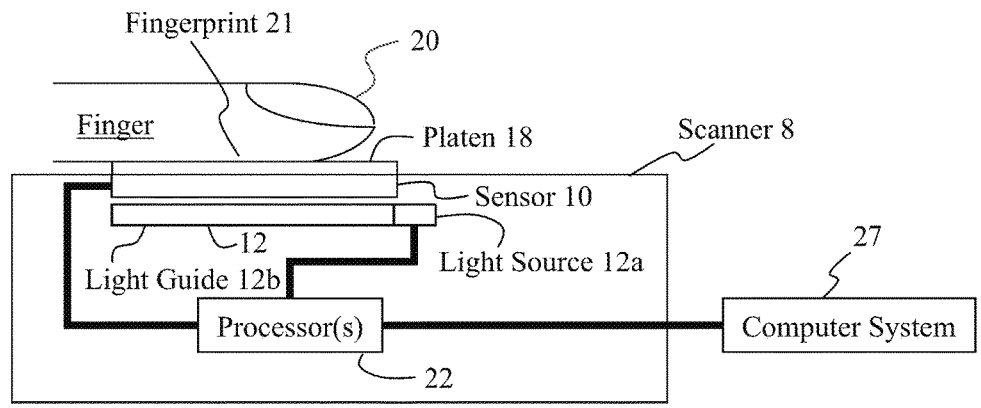
FIG. 1 is block diagram of an apparatus (or fingerprint scanner) having the sensor of the present invention.
Figure 2A:
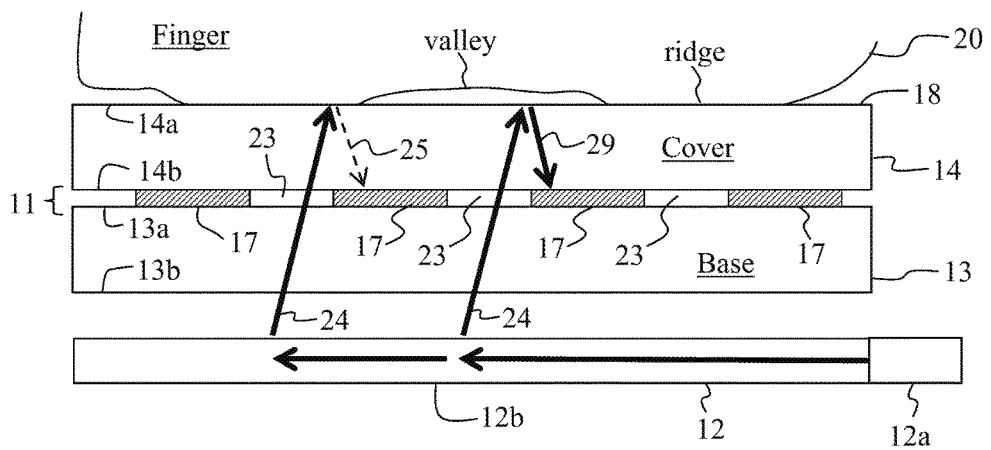
FIG. 2A is a schematic diagram of a part of the sensor of FIG. 1 having light sensing elements and utilizing Fresnel reflection and a light guide.

Referring to FIG. 1, a block diagram of a scanner 8 for capturing fingerprints of one or more fingers (with or without thumb) using a sensor 10 of the present invention is shown. FIG. 1 shows an illuminator 12 for transmitting light to sensor 10. Illuminator 12 may be provided by light source(s) 12a, such as LED(s) providing illumination to a light guide or panel 12b which then directs such illumination towards sensor 10. The sensor 10 is an assembly of a first substrate or base 13 upon which is formed a two-dimensional (2D) array 11 (FIG. 2B) of pixel elements (or pixels) 15 as each location along the array, and a second substrate or cover 14. As shown in FIG. 2A, base 13 has upper surface 13a and a lower surface 13b, the array 11 is formed on a upper surface 13a, and cover 14 has an upper surface 14a opposite base 13. As will be discussed later, in FIG. 4 the base 13 and cover 14 may switch positions, whereby surfaces 13b and 13a are the upper and lower surfaces of base 13, respectively, and surfaces 14b and 14a are the upper and lower surfaces of cover 14, respectively.

Figure 2B:
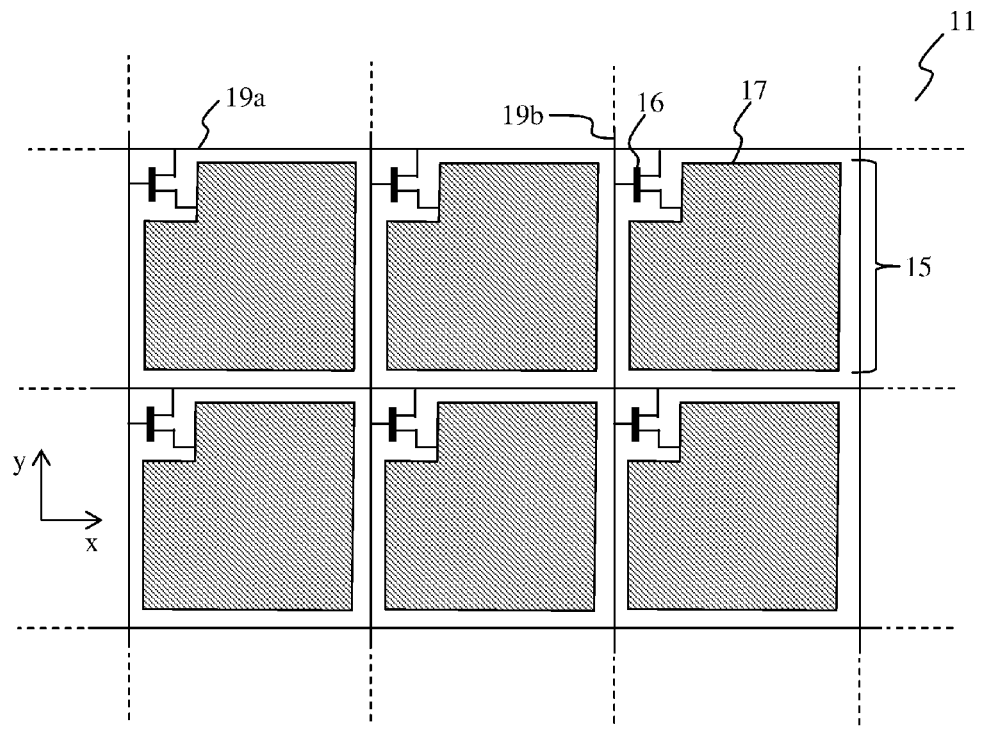
FIG. 2B is a top view of a small section of the array of the sensor of FIG. 1 where at each array location is a TFT and one sensing element.
Figure 2C:
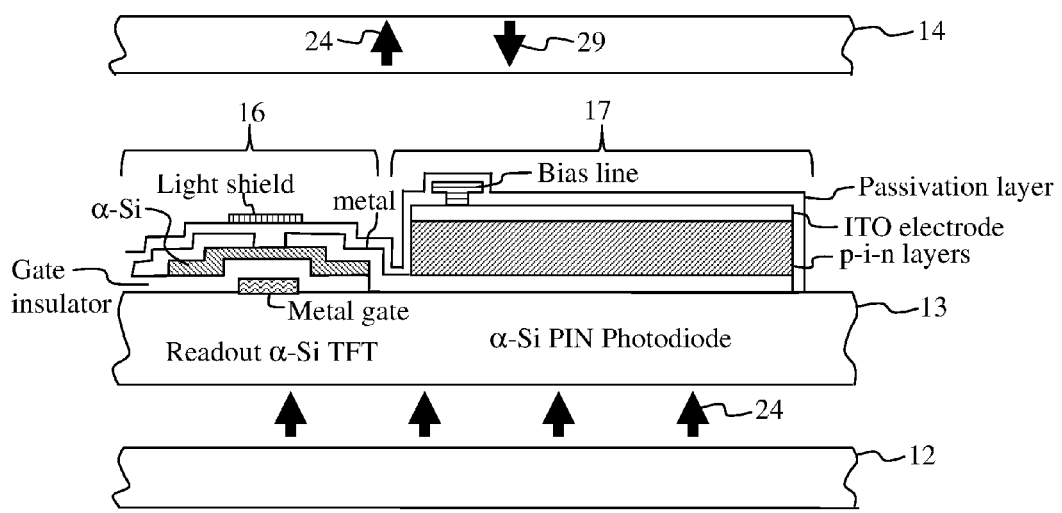
FIG. 2C is a schematic diagram of one of the pixel of FIG. 2B in the configuration of FIG. 2A having a TFT and a light (optical) sensing element.

Referring to FIG. 2B, each pixel 15 has a TFT 16 controlling (driving or reading) a sensing element 17 via lines 19a and 19b for x,y coordinate pixel addressing, respectively, where the 2D array 11 has pixels along x and y axes. By driving is meant to turn on and off the sensing element 17, and reading is to output an analog signal representative of the measurement by the sensing element 17. Array 11 can be produced by conventional photolithographic or printed electronics technologies (for example using machines such as the DMP 3000 currently marketed by FUJI Dimatix, Santa Clara, Calif., USA).

In FIGS. 1, 2A, 2C, and 3-7, the sensing element 17 is a light (optical) sensing element sensitive to wavelength(s) of light 24 of illuminator 12 for measuring the amount of light incident onto the light sensing element for optically detecting reflected light 29 representative of fingerprint(s). The sensing element 17 in the case of a light sensing element is shown for example for a single pixel 15 in FIG. 2C. The sensing element 17 may be one of a photoreceptor, such a p-i-n photosensor. Other types of sensing element 17, than light sensing, may be provided instead at each pixel 15 in the array of FIG. 2B and formed on base 13, such as an electrical sensing element 17 for measuring capacitance, resistance, or inductance, from the skin of finger(s), or a temperature sensing element 17 for measuring thermal activity of the skin of finger(s), or other characteristic of the fingers when presented onto platen 18. Thus, a different array 11 can be provided for different types of sensing of fingerprints, where for each pixel the TFT 16 of the pixel enables readout of an analog signal of the TFT 16 coupled to light sensing element 17 representative of the particular characteristic the sensing element 17 by addressing lines 19a and 19b.

Optionally, the array 17 may having multiple groups of sensing elements 17 of different types, such as one group having light sensing elements and another having electrical sensing elements (or thermal sensing elements). By selection for readout of the sensing elements 17 of each group, different types of two-dimensional images can be obtained, or the light sensing group can provide an image of fingerprints and the information from readout of the electrical (or thermal) sensing group can be used for other purposes, such as to determine if the signals read are in the range of a live finger so as for spoof detection. For example, a uniform distribution may be provided where every N pixels has a sensing element of a different group along x and y axes, where N may be 1 or other number depending of desired resolution by each group of pixels. For example, a non-uniform distribution may be provided have pixels of one group of electrical sensing pixels for liveliness detection of finger(s) present but outside expected fingerprint regions along the array where light sensing pixels are provided.

Figure 2D:
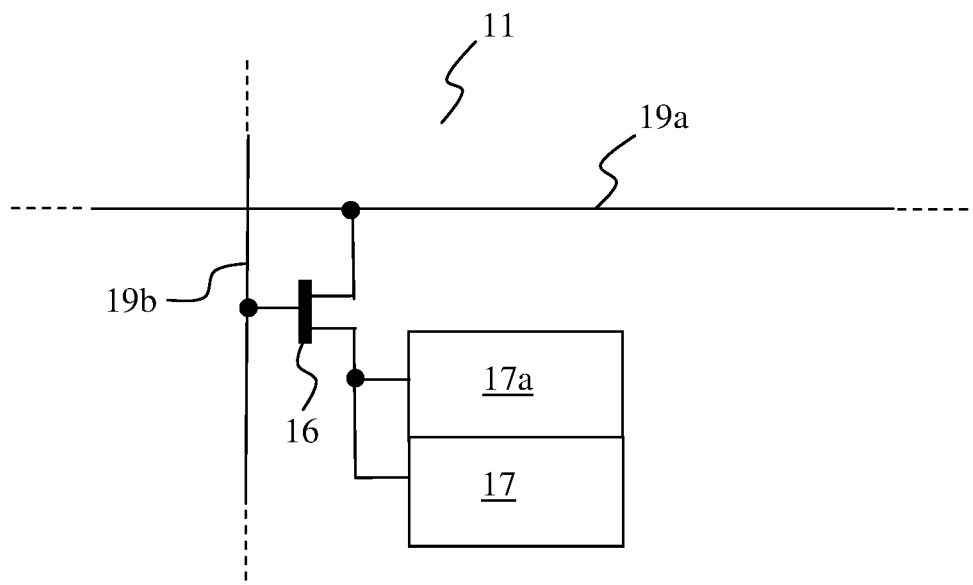
FIG. 2D is a top view of a single pixel element of the array of the sensor of FIG. 1 where having at each array location is a TFT and two sensing elements one a light sensing element and the other an electrical sensing element.

Each pixel 15 may have in addition to a sensing element 17 (e.g., photodetector) for light sensing, a second sensing element 17a for electrical sensing, e.g., capacitance (or temperature sensing), which are both coupled to the same TFT 16 of the pixel, as shown for example in FIG. 2D. Optionally, array 11 may have different pixels each with the same or different number of sensing elements, such as shown in FIG. 2B or 2D, as desired.

Further, instead of each pixel 15 having a single TFT and one sensing element (FIG. 2B) or multiple sensing elements (FIG. 2D), each pixel position may be represented by an adjacent group of TFTs, such as 4 by 4. Although only one sensing element 17 is shown coupled to one TFT 16, a single TFT 16 may be connected to sensing elements of different types for controlling such sensing elements.

Figure 2E:
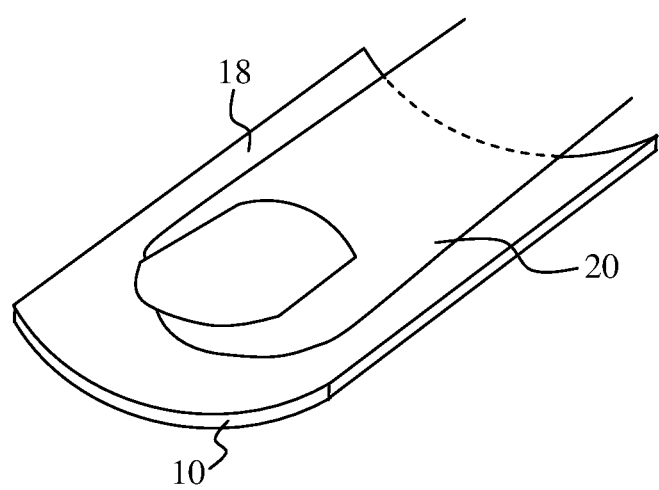
FIG. 2E is an example of a flexible curved sensor of FIG. 1 (or sling type configuration) for detecting a single fingerprint.

The top surface of cover 14 provides a platen or platen surface 18 upon which one or more fingers 20 (with or without thumb) may be pressed against so that the sensing element 17 of array 15 can detect one of electrical signals, temperature, or light representative of fingerprint(s) 21 in accordance with the type of sensing element. The sensor 10 (sandwich of substrates or layers of base 13 and cover 14, and array 11) may be flat to provide a flat platen 18, or have curvature as shown for example in FIG. 2E to provide a curved platen, depending on the desired geometry of base 13 over which cover 14 extends. Preferably, the sensing elements in the array 11 of sensor 10 of FIG. 2E are electrical sensing elements, such as for capacitance or other non-optical based sensing elements.

One or more processors 22 control operation of the scanner 8, including at least the sensor 10, as well as the illumination source 12a (e.g., illuminator 12) if present, by cables or wires shown in FIG. 1. The processor(s) 22 control pixel selection/scanning and receives analog signals from the TFTs 16 of array 11 representative of measurement by their associated sensing element(s) 17 to provide a two-dimensional image representative of pixel output values at locations along array 11, and then performs image processing, if needed, of the image captured and received from sensor 10, such as segmentation, as typical of a fingerprint scanner. For example, the illuminator 12 is turned on by processor(s) 22 and at each pixel an analog signal is readout representing the analog signal from sensing element 17 at each x,y pixel location and stored at a location in memory of the processor or other memory coupled thereto which represents a 2D image of a fingerprint(s). Where more than one group of sensing elements of different types is provided in array 11, the processor(s) 22 performs this operation for each different group of sensing elements at the same time or successively. Additional electronics (and any software in processor(s) for driving and reading the TFT) may be utilized which are the same as used in TFT based sensors for digital radiology imaging scanners and systems.

In the case of array 11 having a pixel 15 with two or more different types of sensing elements, one light sensing element 17 and the other electrical or temperature sensing element 17a are coupled to a common TFT 16 for drive and readout. The illuminator 12 is turned on by processor(s) 22 and at each pixel an analog signal is read out representing the combine analog signal from both sensing elements 17 and 17a at each x,y pixel location and converted into a digital signal and stored at a first location in memory of the processor or other memory coupled thereto. The illuminator 12 is then turned off by processor(s) 22 and at each pixel location an analog signal is read out representing the analog signal from sensing elements 17a (or at least substantially so where ambient light is limited by hood over the platen or other means) at each x,y pixel location and converted into a digital signal for stored in a second location in memory of the processor or other memory coupled thereto. By the processor(s) 22 subtracting at each pixel location the digital signals at the first and second memory locations, the result is a digital signal at each pixel location representative (or at least substantially so) of sensing elements 17 and hence representative of fingerprint(s). Alternatively, depending on each different sensing element in a pixel, the analog signal readout may be performed simultaneous in which each of the sensing element have distinguishable signal characteristics, such as AC or DC.

The scanner 8 may be coupled by a power and communication cable, or wirelessly, to a computer system or other microprocessor based system 27 having other processor(s) for processing of image(s) captured by the scanner from processor(s) 22, and/or such processing may be carried out by processor(s) in housing of scanner 8. Optionally, computer system 27 may be in the same housing as scanner 8. The computer system 27 and/or processor(s) 22 may store fingerprint images segmented from images captured by apparatus in memory (e.g., memory of processor(s) or separate memory accessible to the processors, and/or computer system) for later use for fingerprint enrollment, verification, or identification as typical of a biometric-based security systems.

Referring to FIG. 2A, a portion of the sensor 10 is shown with illuminator 12 of FIG. 1, where for purposes of illustration array 11 is illustrated by sensing elements 17 without TFTs 16. The electronics of array 11, e.g., TFTs 16, sensing elements 17, and lines 19a and 19b (or other electronics needed such as in TFT based digital radiology imaging) are protected by cover 14 being disposed between such cover which provides platen surface 18, and base 13 onto which the array 11 was fabricated. For a sensor 10 having light sensing elements 17, cover 14 is preferentially transmissive at the wavelength of operation of the scanner 8, i.e., of wavelengths of operation of illuminator 12 and light sensing elements 17. The cover 14 may be composed of a separate sheet of glass that is attached by epoxy or other adhesive that is optically transparent to the wavelength(s) of the illumination by illuminator 12. Preferably, the cover 14 is of glass that is very thin in order to maximize the spatial resolution the array 11 can achieve in the image of a fingerprint. Such thin glass may be for example 100 µm and 50 µm thick, and may be obtained from Corning, Inc. (Corning, N.Y., USA) or Schott Glass. Alternatively the cover 14 comprises one or more thin-film coatings (for example silicon nitride, $SiO_2$, SiO, and/or $TiO_2$) that are deposited directly onto the array 11 without need for epoxy or adhesive layer and serve as the protective cover 14 where the upper surface thereof provide platen 18. As such the coating protects array 11 and its associated electronics. This coating could be submicron to only a few microns in thickness. In another embodiment, the cover 14 does not encapsulate array 11, but rather a polymer (such as an epoxy) coats array 11 and is cured (e.g., UV, heat, time, etc.) in order to encapsulate the array and provide a very thin distance (microns to 10s of microns) between where the finger is placed, i.e., platen 18, and array 11.

FIG. 2A shows sensor 10 with sensing elements 17 which detect light of illuminator 12, gaps 23 are present between the sensing elements 17 such that a portion of the light (shows as arrows 24 in direction of the array 11) can pass between adjacent sensing elements 17 toward the platen surface 18, via base 13 and cover 14, onto which a finger 20 may be presented. Preferably, the sensing elements 17 are not exposed by the light from the illuminator 12 before it strikes the platen surface 18 since the bottom of the sensing elements 17 are coated with an opaque material. For example, a fingerprint scanner 8 operating at 500 ppi (light sensing element 17 being 50.8 µm by 50.8 µm in size at each pixel 15), the gaps 23 the light 24 transmits through may be comprise 5 to 30% of the array area (if the gap is square in shape this corresponds to lengths and widths ranging from 11 to 28 µm), but other dimensions may be used. The number of pixels 15 in the two dimensional array 11 depends on the desired size of a platen 18 for the scanner. For example, for a 350 ppi single-finger sensor 10 with an active sensor area of 0.5×0.8", needs 175×280 pixels in the array, while a 500 ppi four-finger scanner with an active sensor area of 3.2"×3.0" requires 750×800 pixels in the array. The light guide 12b extends approximately along the same two-dimensional extent as array 11.

In one mode of operation of sensor 10 of FIG. 2A, the sensor 10 operates on Fresnel reflection that occurs at the platen surface 18, and light representing the fingerprint topology (denoted by arrow 29) is directed toward the sensor's light sensing elements 17 which then each convert light received into an analog electrical signal representative of such received light, thereby enabling capture of pixel values representing the fingerprint topology, e.g., such as ridges (dark) or valleys (light), or vice versa. The light guide 12b may be similar to light guides as used in typical backlight LCD displays. The dashed line 25 indicates little light is reflected due to rough index match between skin of finger 20 and the cover 14. As mentioned earlier, the cover 14 ideally is as thin as possible to maintain the resolution of fingerprint 21, preferably 0.3 mm or less thick. The thicker the cover 14 the more critical it is to control the illumination 24 and reflected light 29 to maintain spatial resolution. For very thin covers 14 (i.e., microns in width), diffuse illumination such as that from typical LCD display backlights may be used. However as the thickness of the cover 14 increases, diffuse light can create optical crosstalk that degrades the resolution of the sensor. Optical crosstalk is defined as the case where light waves/rays propagating at very different angles of incidence with respect to the platen surface 18 strike the same spatial location of the platen, thereby capturing the same or very similar optical information about the fingerprint touching (or not touching) the platen at that particular location. On reflection, however, since the two light waves/rays are propagating at different angles due to the diffuse nature of the light, data from the same spatial location of the platen may go to two or more different sensing elements 17 or pixels, and hence creating optical crosstalk, thereby degrading spatial resolution. To avoid this, it is preferred that the light guide 12b, or other form of illumination, transmits collimated light rather than diffuse illumination. Such a collimating lightguide may be purchased from Global Lighting (Ohio, USA) or constructed using optical elements (Fresnel or diffractive optics being preferred for compactness) to collimate illumination of light source 12a (e.g., LEDs) and direct them towards the array 11.

Figure 3:
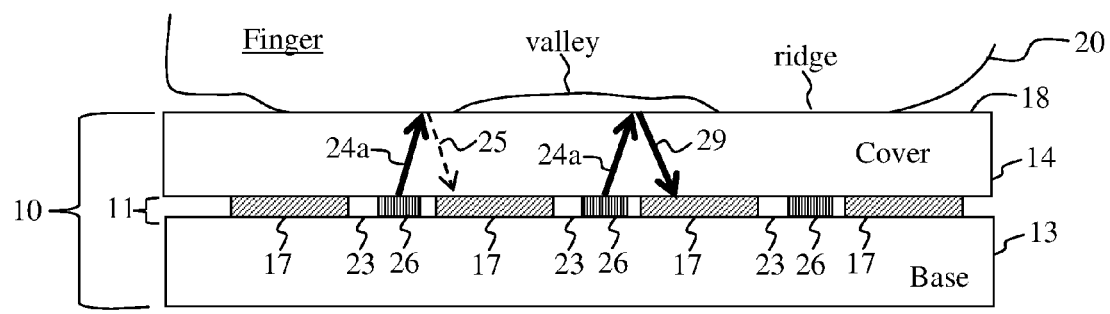
FIG. 3 is a schematic diagram of a part of the sensor of FIG. 1 similar to FIG. 2A where the light guide of FIG. 2A is replaced by light sources each disposed between adjacent pixels along the array.

Referring to FIG. 3, sensor 10 is similar to that shown in FIG. 2A but instead of a illuminator 12, a light source 26 is formed in the gap 23 between adjacent sensing elements 17, or every N number of sensor elements 17 long each row or column of the array 11 sufficient to direct light through the cover 14 to the platen surface 18 at the top thereof. For example, N may be 2 or any other number, needed to obtain the desired performance in the captured image. In this manner an array of light sources 26 is provided between the base 13 and cover 14 for providing light 24a to platen surface 18, rather than by light 24 of FIG. 2A. Although illustrated as being in the same plane as array 11, the light source 11 may be in an array above or below the plane of the sensing elements 17 and fabricated sequential or in parallel with array 11 on the same base 13, or fabricated on a separate base or substrate and then joined together with careful spatial alignment and an adhesive. Each light source 26 may represent one or more light emitters that preferentially are one or more of light emitting diodes (LEDs) and organic LEDs (OLEDs). Particularly for a cover 14 that is more than a few microns thick, it is preferential that light source 26 contain light shaping optics as well, where said optics may steer and collimate light from light emitters in the preferred direction of the platen surface 18. Said optics may contain Frensel, diffractive, or microlenses. The light from the light sources 26 thereby extends towards the cover 14 in an upward direction and via Fresnel reflection onto the array 11 for capture by the light sensing elements 17 of the array. Fresnel reflection refers to the reflection of light at the boundary of two mediums of different indices of refraction. The Fresnel reflection is not limited to a particular angles of incidence and as such covers light that may be only a few degrees off of the surface normal to light that is at an angle above the total internal reflection (TIR) angle of the cover 14 material to air. Preferably, the cover 14 in FIG. 3 is as thin as possible to maintain resolution of fingerprint, such as 0.3 mm or less.

Figure 4:
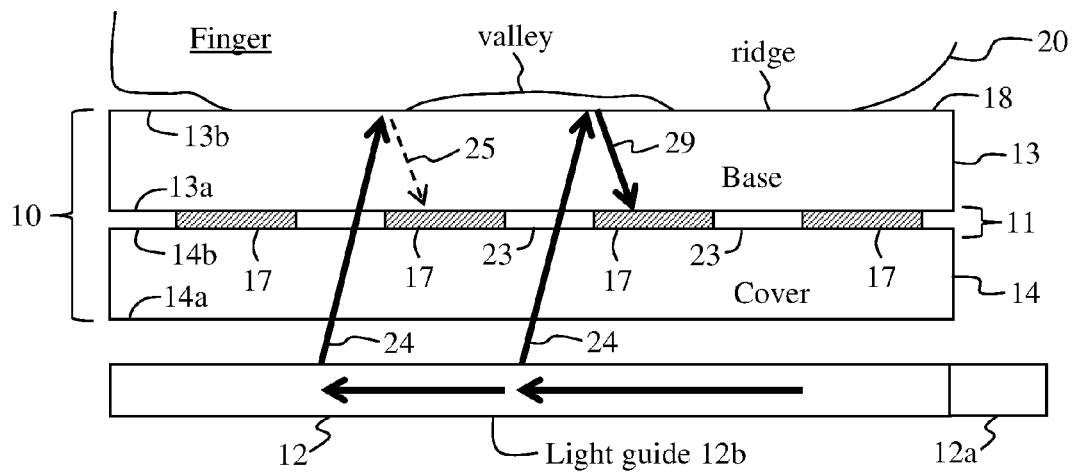
FIG. 4 is a schematic diagram of a part of the sensor of FIG. 1 similar to FIG. 2A in which the base substrate provides the top of the sensor and the platen surface, rather than the cover substrate as shown in FIG. 2A, such that array is disposed upside down from that of FIG. 2A.

Referring to FIG. 4, the sensor 10 shown is similar to that of FIG. 2A, but where the positions of the cover 14 and base 13 are reversed, such that surface 13b of the base 13 provides top platen surface 18, as such the sensor 10 is "upside down". Thus, array 11 is formed on base 13 which also serves as a cover for the electronics of the array 11 from the finger(s) 20. Otherwise, the sensor 10 of FIG. 4 operates the same as the sensor of FIG. 2A. This "upside down" configuration is unlike TFT based sensors as used in digital radiology which are made on 1.0 or 0.7 mm thick glass such that light to image/detect is meant to come from opposite side of the base 13 glass. This has the advantage that when using a separate substrate (which could be the light guide itself) to seal the array 11 and thereby form the cover 14, bubbles in epoxy/adhesive created during the encapsulation process only affect illumination 24 and not the imaging via reflected light 29.

Figure 5:
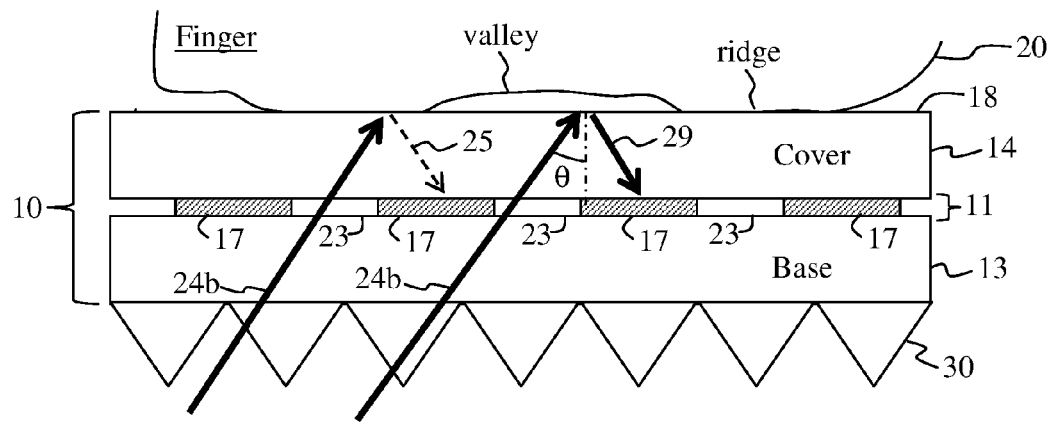
FIG. 5 is a schematic diagram of a part of the sensor of FIG. 1 similar to FIG. 2A utilizing TIR reflection and the additional of a prism element to refract and/or diffract light incident the sensor, such as from a light guide of FIG. 2A, using TIR reflection.

Referring to FIG. 5, the sensor 10 shown is similar to that of FIG. 2A, but with the addition of a microprism array 30 in which light from the light guide 12b is refracted or diffracted through the gaps 23 of the array 11 and reflected back by TIR 29 to the array 11 for detection. The sensor 10 can be air rejecting or water-rejecting. For example if the cover 14 has index of 1.52, an angle of θ=45 deg would be air-rejecting and angle of θ=64 deg would be water rejecting. Similarly the microprism 30 may be a diffractive grating that achieves the same result. Otherwise, the sensor 10 of FIG. 5 operates the same as the sensor of FIG. 2A.

Figure 6:
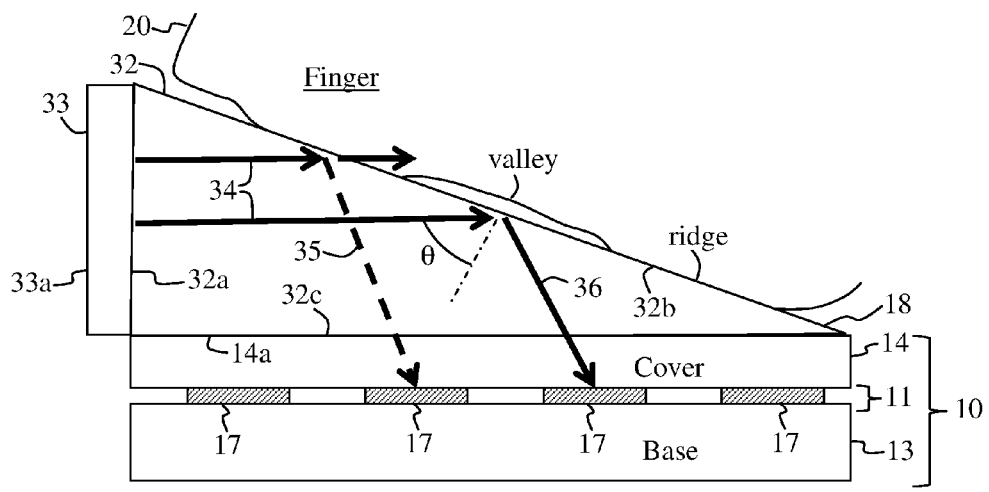
FIG. 6 is a schematic diagram of a part of the sensor of FIG. 1 utilizing a triangular prism element as the platen surface and TIR reflection from light entering the prism element and reflecting onto the array.

Referring to FIG. 6, the sensor 10 shown is similar to that of FIG. 2A but without illuminator 12, where an optical element provided by right angled prism 32 is attached to top surface 14a of cover 14, or alternatively the bottom surface of the prism 32 can be adjacent to the electronics providing array 11 and attached thereto by epoxy, thereby eliminating the need for a separate cover. In this geometry no light source is required beneath the array 11 and therefore the pixels of the array need not require an optical transparent gap nor does the base 13 require to be optical transparent. Light 34 from an illuminator 33, which may be the same as illuminator 12, but vertically disposed so that its light guide 33a is disposed two-dimensionally along a first light entry surface or facet 32a of prism 32 and is reflected off of the platen 18 that a second surface 32b of the prism 32 provides. The prism 32 and light orientation may be constructed such that the light is incident upon the platen 18 is at an angle θ such that TIR takes place (either air rejection or water-rejection). The reflected light 36 from the platen 18 is directed towards the sensing elements 17 of array 11. The dashed line 35 indicated little light is reflected due to rough index match between skin of finger 20 and surface 32b of prism 32. Otherwise, the sensor of FIG. 6 operates the same as the sensor of FIG. 2A in response to reflected light 36 representing one or more fingerprints.

Although surface 32a is at a right angle (perpendicular) to prism's surface 32c attached to surface 14a of cover 14, prism 32 may similarly be attached to surface 13b of base 13 in the case of the sensor 10 of FIG. 4.

Figure 7:
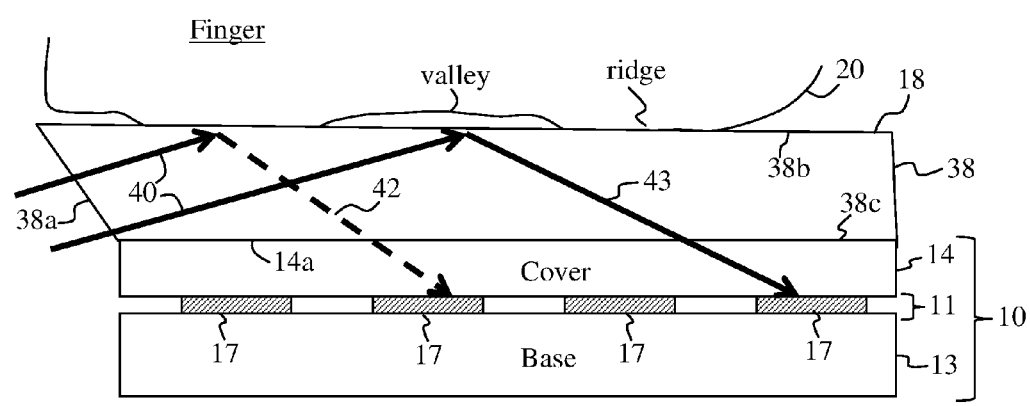
FIG. 7 is a schematic diagram of a part of the sensor of FIG. 1 utilizing a rectangular prism element as the platen surface and TIR reflection from light entering the prism element and reflecting onto the array.

Referring to FIG. 7, the sensor 10 shown is similar to that of FIG. 6, where prism 33 is replaced by a prism 38 having a rectangular surface, so that the path length of light rays reflected from the top surface 38b of the prism 38 providing the platen surface 18 are same to the array 11 plane approximately equal across the width of the array 11, as oppose to the unequal length depicted for the prism 32 of FIG. 6. In other words, the platen surface 18 provided by prism 38 is along a plane parallel to the plane of the sensing elements of the array. Otherwise, the sensor 10 of FIG. 7 operates the same as the sensor of FIG. 2A in response to reflected light 43 representing one or more fingerprints.

Surface 38a of prism 38 may be rectangular (right angle), obtuse (as shown) with respect to its surface 38c attached to surface 14a of cover 14, or at another angle, so long as light 40 is directed at a TIR angle with respect to surface 38a from a light source so that light 43 is reflected from platen 18 onto array 11. The dashed line 42 indicates that little light is reflected due to rough index match between skin of finger 20 and surface 38b of prism 38. Although surface 38c of the prism 38 is attached to surface 14a of cover 14, prism 38 may similarly be attached to surface 13b of base 13 in the case of the sensor of FIG. 4.

The sensor 10 of FIGS. 6 and 7 can be air rejecting or water-rejecting. Preference is to choose short wavelength LED (green or even blue or violet) as well as to collimate illumination light as much as possible. Reason is so light will diverge/diffract least amount before hitting array 11, thereby maximizing imaging resolution without need for separate imaging optics (i.e., lenses). Since light is not transmitting through the array 11 during illumination, the sensor as shown in FIGS. 6 and 7 can have less preferably a CMOS or CCD sensor array below cover 14 in place of array 11 with or without base 13.

Optionally, polarized light may be used in sensor 10. Incident light can be polarized and a polarizer be placed directly over array 11 or upon a part of the sensor 10 through with light from illuminator 12 passes prior to platen 18. Illuminator 12 (or 33 FIG. 6) for example may have a polarizer film or plate. Light that is reflected at valleys of fingerprint reflects off of platen surface 18 (could be glass or plastic material) and maintains polarization. Light that hits fingerprint ridges will be absorbed and reradiated and in the process be depolarized. Polarizer may help reject this scattered light. More critical for red illumination than for green or blue, since skin absorbs much less in red and so will scatter more red light.

The sensor 10 may use TIR as described above, or ambient Light Rejection TIR may be used, in which platen 18 may have an ALRF film, such that most of ambient light is reflected by the platen and the array 11 sees primarily desired illumination light and not outside light.

As stated earlier, although the figures are shown directed to an array 11 utilizing sensing elements 17 for detecting light, other types of sensing elements may be used for electrical (capacitance, resistance, or inductance) or temperature sensing without any sensing element for detecting light, in which case the sensor 10 is the same as shown in FIGS. 1 and 2A but without illuminator 12. Further, an array 11 may have different type(s) of sensing elements in addition of those for detecting light, in which non-optical (electrical and/or temperature) sensing elements provide additional imaging or liveliness detection to processor(s) 22, such as in the case of a pixel of FIG. 2D. Further, other types of sensing elements may be provided at a pixel location, such as radio frequency sensing elements for reading an RFID presented to the sensor 10 by processor(s) in addition to reading objects, such as a skin topology, documents, signatures, or bar codes, presented to the platen 18 of sensor 10. Such an RFID sensing element may be the sole sensing element at each of one or more pixels 15, or one of multiple sensing elements at each of one or more pixels 15, as desired.

From the foregoing description, it will be apparent that there has been provided an improved fingerprint sensors and systems utilizing same. Variations and modifications in the herein described sensors, methods, and systems will undoubtedly suggest themselves to those skilled in the art. Accordingly, the foregoing description should be taken as illustrative and not in a limiting sense.

The invention claimed is:

1. A sensor for detecting one or more fingerprints comprising:
    a first substrate and a second substrate;
    a two-dimensional array of sensing elements between said first substrate and said second substrate, wherein said sensing elements of said array are at least light sensing elements;
    a plurality of thin-film transistors for controlling said sensing elements; and
    a plurality of light sources which actively generates light being disposed between said first substrate and said second substrate distributed at locations among said array of said light sensing elements for transmitting illumination via said second substrate, in which said light sensing elements detect reflected illumination representative of one or more fingerprints via said second substrate, wherein each of said light sources comprises at least one of a diffractive element or a Fresnel element between the light source and said second substrate for shaping light from the light source without any TIR between the light source and said at least one of a diffractive element or a Fresnel element.

2. The sensor according to claim 1 wherein said second substrate has a surface opposite said first substrate, and said surface provides a platen surface for placement upon by said one or more fingers.

3. The sensor according to claim 1 further comprising pixel locations along said array each associated with a different one of said light sensing elements, in which said light sources are distributed every N number said pixel locations.

4. The sensor according to claim 3 wherein N equals one.

5. The sensor according to claim 1 wherein each of said light sources represents one or more light emitters.

6. The sensor according to claim 1 further comprising one or more processors, each of said thin-film transistors controls said one or more of said sensing elements responsive to said one or more processors to enable said one or more processor to one or more of driving said one or more of said sensing elements or reading from said one or more sensing elements analog signals representative of said one or more fingerprints, and generates an image representative of said one or more fingerprints responsive to said analog signals.

7. The sensor according to claim 6 wherein at least one of said one or more of said processors is part of a computer system.

8. The sensor according to claim 1 wherein said light sources are each one or more light emitting diodes.

9. The sensor according to claim 1 wherein said light sources are each one or more organic light emitting diodes.

10. The sensor according to claim 1 wherein said second substrate has a surface opposite said first substrate, and said surface provides a platen surface for placement upon by said one or more fingers, each of said light sources represents one or more light emitters, wherein said at least one of a diffractive element or a Fresnel element represent optics that one or more of steer and collimate illumination from said one more light emitters in direction of said platen surface.

11. The sensor according to claim 1 further comprising other sensing elements for receiving temperature signals via one of said first substrate or said second substrate.

12. The sensor according to claim 1 further comprising pixel locations along said array each associated with a different one of said light sensing elements, wherein at at least one of said pixel locations along said array is at least one other sensing element for sensing a different characteristic than light.

13. The sensor according to claim 1 further comprising sensing elements for sensing one or more different types of characteristics than light.

14. The sensor according to claim 1 wherein said illumination is green or of one or more wavelengths shorter than green.

15. The sensor according to claim 1 wherein said light sensing elements are along a plane, and said light sources are along a same plane as said light sensing elements.

16. The sensor according to claim 1 wherein said light sensing elements are along a plane, and said light sources are along a different plane from said light sensing elements.

17. A method for detecting one or more fingerprints comprising:
    providing a two-dimensional array of sensing elements between a first substrate and;
    controlling said sensing elements using a plurality of thin-film transistors;
    providing light sources for actively generating light between said first substrate and said second substrate for transmitting illumination via said second substrate, and said light sensing elements detect reflected illumination representative of one or more fingerprints presented upon said second substrate; and providing for each of said light sources at least one of a diffractive element or a Fresnel element between the light source and said second substrate for shaping light from the light source without any TIR between the light source and said at least one of a diffractive element or a Fresnel element.

18. The sensor according to claim 1 wherein said array of light sensing elements further comprises electrical sensing elements for receiving electrical signals representative of one or more fingerprints or for detecting liveliness of said one or more fingers.

19. The sensor according to claim 18 wherein said electrical signals are one of capacitance, resistance, or impedance.

20. A device for capturing an image of an object comprising:
  a first substrate and a second substrate;
  a two dimensional array of light sensing elements, in which one of said first and second substrates provides a platen surface for capturing an image of an object when disposed upon said platen surface;
  a plurality of thin-film transistors for controlling said light sensing elements; and
  a plurality of light sources which actively generates light being disposed between said first and second substrates to enable reflected light representing said object to be captured onto said two dimensional array of light sensing elements, optics between said light sources and said platen surface comprising at least one of a diffractive element, or a Fresnel element, and without any TIR between the light source and said at least one of a diffractive element or a Fresnel element.

21. The device according to claim 20 wherein said object is a document, a signature, a bar code, or one or more fingers.

22. The device according to claim 20 wherein said optics shape illumination from said light sources to said platen surface.

23. The device according to claim 20 wherein said optics steer illumination from said light sources to said platen surface.

24. The device according to claim 20 wherein said optics collimate illumination from said light sources to said platen surface.

* * * * *